(12) United States Patent
Röders

(10) Patent No.: US 7,706,913 B2
(45) Date of Patent: Apr. 27, 2010

(54) METHOD FOR MACHINING A WORKPIECE BY MEANS OF A ROTATING CUTTING TOOL

(75) Inventor: Jürgen Röders, Hamburg (DE)

(73) Assignee: P & L GmbH & Co. KG (DE)

( * ) Notice: Subject to any disclaimer, the term of this patent is extended or adjusted under 35 U.S.C. 154(b) by 665 days.

(21) Appl. No.: 10/571,410

(22) PCT Filed: Sep. 10, 2004

(86) PCT No.: PCT/EP2004/010166

§ 371 (c)(1),
(2), (4) Date: Nov. 29, 2006

(87) PCT Pub. No.: WO2005/026856

PCT Pub. Date: Mar. 24, 2005

(65) Prior Publication Data

US 2008/0154424 A1    Jun. 26, 2008

(30) Foreign Application Priority Data

Sep. 10, 2003    (DE) .............................. 103 41 776

(51) Int. Cl.
*G06F 19/00* (2006.01)
(52) U.S. Cl. ...................................... 700/187; 700/191
(58) Field of Classification Search ................. 700/187; 409/84, 132
See application file for complete search history.

(56) References Cited

U.S. PATENT DOCUMENTS

| 4,764,878 | A | * | 8/1988 | Tanaka et al. | ............... 700/191 |
| 4,989,152 | A |  | 1/1991 | Cheng |  |
| 5,595,463 | A |  | 1/1997 | Takegahara et al. |  |
| 6,428,252 | B1 | * | 8/2002 | Oldani | ...................... 409/132 |
| 2003/0114954 | A1 | * | 6/2003 | Inagaki et al. | ............... 700/193 |

FOREIGN PATENT DOCUMENTS

| DE | 4323573 | 1/1994 |
| JP | 2000-126987 | 9/2000 |

OTHER PUBLICATIONS

International Search Report and Written Opinion for parent PCT Application No. PCT/EP2004/010166.

* cited by examiner

*Primary Examiner*—Albert DeCady
*Assistant Examiner*—Sivalingam Sivanesan
(74) *Attorney, Agent, or Firm*—Sheridan Ross P.C.

(57) ABSTRACT

A method for machining a workpiece 1 by means of a rotating cutting tool 2, in which the tool 2 is moved along paths 3 relative to the workpiece 1, characterized in that limits of machining portions to be machined by means of at least one tool 2 are determined, that within the range of the limits of machining portions to be machined by means of the tool 2 an infeed and/or lifting movement of the tool 2 is defined and that the infeed or lifting movement during machining of the workpiece 1 is carried out within the range of the limits of machining portions to be machined by means of the tool 2.

11 Claims, 3 Drawing Sheets

METHOD FOR MACHINING A WORKPIECE
BY MEANS OF A ROTATING CUTTING TOOL

The present invention relates to a method according to the features of the preamble of the main claim. Specifically, the present invention relates to a method for machining a workpiece by means of a rotating cutting tool (or machining tool or metal-cutting tool), wherein the tool is moved along paths relative to the workpiece.

The underlying prior art shall now be described in connection with the figures, of which:

When workpieces are machined by way of milling or grinding, the tool geometry depends on the geometry of the workpiece. To be more specific, the inner radii in the workpiece determine the maximum outer diameter of the tool that can be used. When freeforms are produced in toolmaking and die construction by milling with spherical milling tools, the radius of the milling tool, for instance, must always be smaller than or equal to the minimum inner radius in the surface so as to be able to produce the same. Otherwise, an undesired residual material remains in the inner radii of the workpiece after machining.

Figure 1:
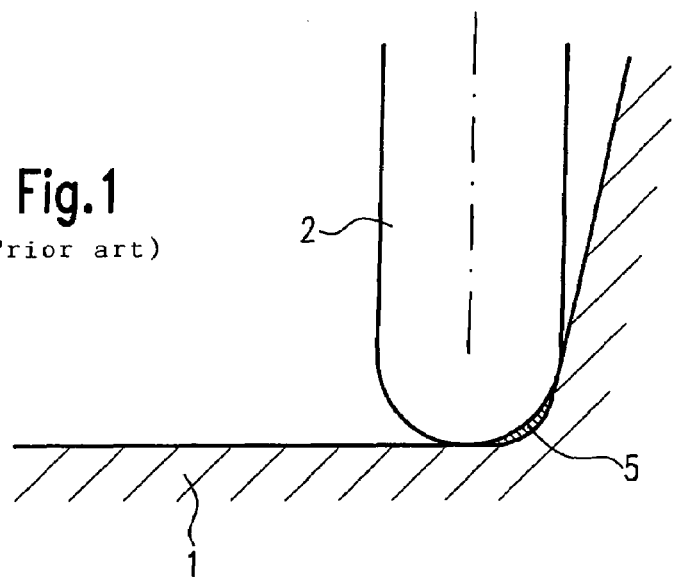
FIG. 1 is a schematic illustration showing a machining process on a transition portion of a workpiece.

FIG. 1 shows such a machining state in a workpiece 1 the surface of which passes from a horizontal region into an inclined flank. During machining with the help of a rotating tool 2, which has a semicircular cross-section on its front end, residual material 5 remains in the channel.

On the other hand, it is desired to use a tool that is as large as possible for the machining operation to achieve machining times that are as short as possible, for the tool radius defines the possible lateral infeed together with a desired surface quality. The greater the radius of the machining tool, the larger can also be the lateral infeed (with the same surface quality on the workpiece), i.e., for instance, during milling with spherical tools, the line spacing between the individual tool paths. The greater the possible infeed or the line spacing, the shorter is the machining program and thus also the machining time.

Figure 2:
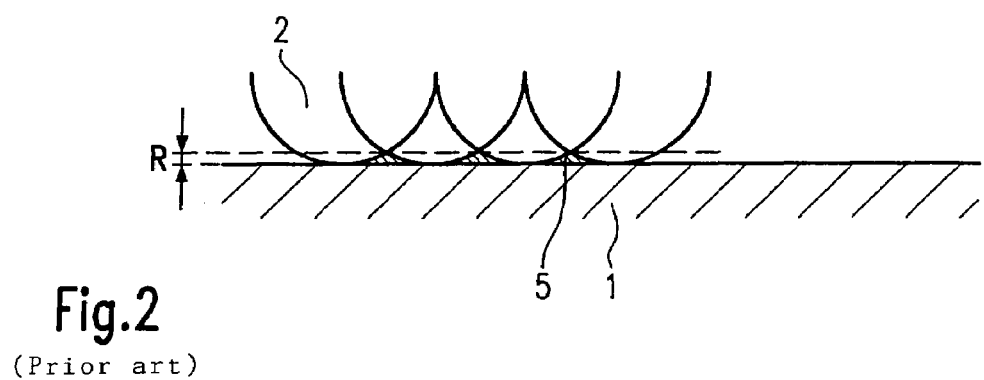
FIG. 2 shows the machining process of a workpiece along a plurality of paths.

FIG. 2 shows this state in which the different paths which are parallel to one another are outlined by means of the contour of the tool 2. It is evident that a residual material 5 which leads to a residual roughness R remains between the individual paths.

There are many workpiece geometries in the case of which the smallest inner radii are only present in a small portion of the workpiece. In such workpieces, it would be very uneconomic to carry out the whole machining operation with the machining tool predetermined by the smallest inner radius. As a rule, two or more tools are used, a large one for machining the portions having large radii of curvature, for which a larger infeed can be chosen, and a small tool for machining the geometry portions that can only be machined by said tool. This leads to shorter machining times due to the larger infeed in the larger tool.

Figure 3:
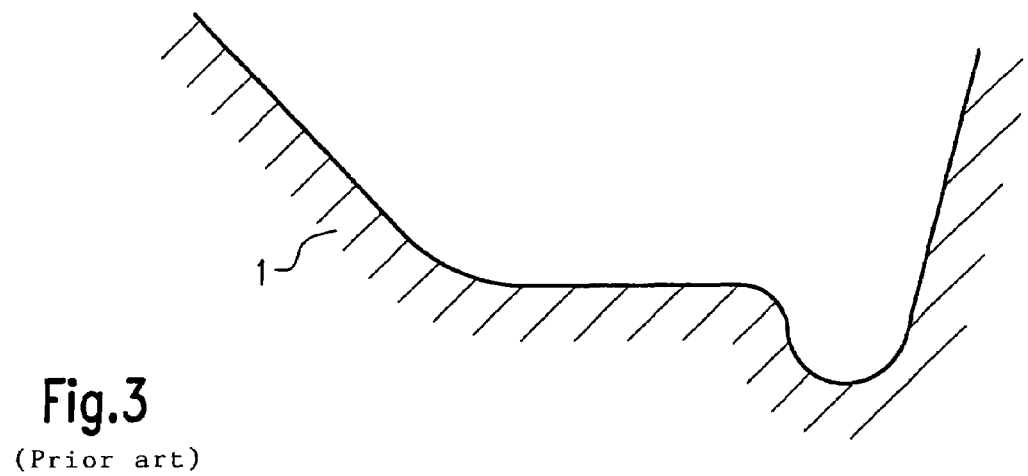
FIG. 3 shows a typical workpiece geometry for use in the present invention.

FIG. 3 shows such a workpiece situation in which a groove-like recess with a relatively small radius must be incorporated.

The above-described procedure has the drawback that due to inaccuracies during measurement of the machining tools in the machine, due to different cutting characteristics (i.e. different cutting pressures) and other effects, small steps are created on the surface of the workpiece, even in cases where the machining tool executes the programs with an ideal accuracy, which in practice cannot be achieved either. These undesired steps require an increased manual finishing operation, particularly in surfaces which must have polishing quality. The steps must be adapted in the finishing operation and eliminated in this way, e.g. by polishing.

Figure 4:
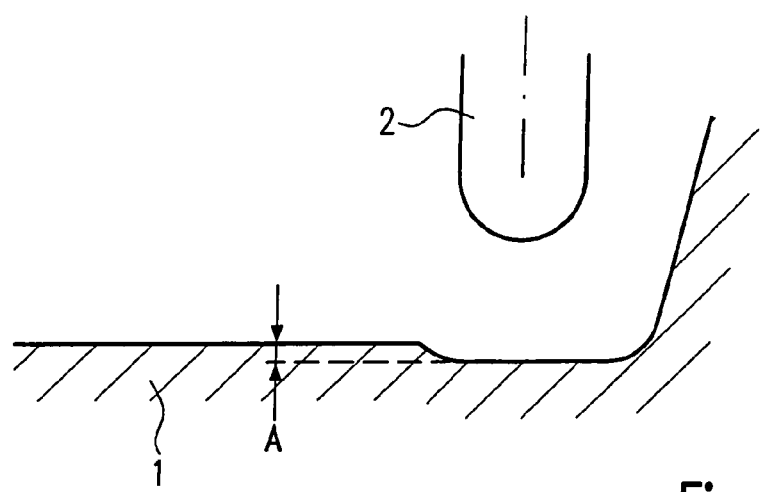
FIG. 4 shows a faulty transition region according to the prior art.

FIG. 4 shows this situation where a step A is specifically illustrated, which is due to the use of the illustrated tool 2 with the smaller diameter.

It is the object of the present invention to provide a method of the above-mentioned type which, while being of a simple configuration and being easily applicable at low costs, avoids the drawbacks of the prior art and particularly creates a good workpiece surface.

According to the invention this object is achieved by the feature combination of the main claim; the subclaims show further advantageous configurations of the invention.

According to the invention, it is thus provided that the limits of machining portions to be machined by means of at least one respective tool are first determined, that an infeed and/or lifting movement of the tool is then defined within the range of said limits, and that the infeed and/or lifting movement is carried out or realized during machining of the workpiece within the range of said limits.

The method according to the invention is distinguished by a number of considerable advantages.

According to the invention, the machining programs are modified in the controller of the machine in compliance with the operator's instructions or also already in the programming system, the CAM system, such that the undesired steps or shoulders are avoided and surfaces which are machined on a workpiece by different tools and shall converge tangentially actually converge tangentially.

In a particularly advantageous configuration of the method according to the invention, the machining limits are defined such that an overlap of neighboring machining portions is obtained.

Hence, the portions which have been machined by different machining tools overlap one another on the workpiece. In addition, the tool paths can be modified in the edge portion of the machining operation of a program according to the invention such that the machining tool during machining minimally moves away from the desired workpiece surface at the places where it approaches the edge of the machining portion of the respective machining program. This slight "lifting movement" must be very small, so that no undesired "kinks" are created in the surface. When this method is used in machining operations with programs for two different machining tools that overlap one another, a "quasi tangential" transition is created on the workpiece surface in the portion that has been produced by the two machining tools although these do not produce exactly the same dimension on the workpiece.

In toolmaking and die construction, the machining programs for a portion of a workpiece are often configured in a meandering fashion. In these meandering programs, the controller can determine the edge portions of the machining operation through a simple geometry analysis that is calculated online during machining. A meandering machining operation normally includes four edge portions, similar to the four sides of a rectangle, which must be modified for this purpose. One side is defined by the beginning of the machining operation and must be equated with the beginning of the machining program. Another side is produced by the program end and can be easily recognized with the help of a corresponding forecast (look-ahead function as is known in modern controllers). The two other sides are distinguished by the line spacing in the program and can e.g. be recognized easily by way of a simple geometrical analysis in the machining plane. In the meander a directional reversal of about 180 degrees is carried out in the program with an intermediate step for translation into the next line. This geometry characterizes the translation into the next machining line in an unambiguous manner and can be reliably recognized in the controller with the help of simple mathematical functions. In the non-meandering machining operations, similar criteria can be found for recognizing the edge portions of a machining operation.

Alternatively, it is possible to define the edge portions of a machining operation also on the screen, e.g. with the help of a simulation program which displays the tool paths on the screen. By plotting simple auxiliary lines, the beginning of the edge portions can be defined by the operator. The degree of the lifting movement can be defined through further simple data, e.g. the pitch in 0.001 mm/1 mm.

The definition of the limits for the machining operation or the edge portions for the machining operation can thus be carried out by the user, so to speak "manually". However, it is also possible to have these limits defined "automatically" by the machining program.

The lifting of the tool in the edge portions of a machining operation is carried out according to the invention in a favorable configuration of the invention in a direction normal to the surface of the workpiece to be produced. To this end it is possible to consult the normal vectors indicated by the programming system auxiliarily in the machining program, said vectors defining the normal to the workpiece surface at the respective program point.

Alternatively, it is possible according to the invention to calculate a simulation of the machining operation online in the controller. The simulation calculates online the machining progress on the workpiece with the help of the geometry data of the machining tool that are known in the controller, and can detect on the basis thereof how the inclination of the workpiece surface is positioned at the respective machining point in space and can thus detect the lifting direction. An online simulation can also be used for detecting the edge portions of a machining operation. To this end, an adequately dimensioned look-ahead function (forecast) must just be provided for determining the program end.

It is also possible in a simplified manner according to the invention to define a tool axis or any desired other fixed direction in space as a lifting direction. This method is adequate in very flat machining operations.

According to the invention, it is also advantageous to carry out not only a lifting movement, but also a slow infeed, e.g. at the beginning of the program. Due to the lifting or infeed movement of the machining tool, a slight change in the machining process is accomplished. This leads to a slight change in the workpiece geometry. The lifting or infeed movement is ideally carried out by the controller such that a tangential transition, if possible without any kinks or bends, is created towards the machining portion where no lifting movement is carried out. The workpiece geometry changed by the lifting movement can be configured in linearly ascending fashion towards the edge of the machining portion of a program. Of course, any other mathematical functions are possible, e.g. parabolas.

The described modifications in the machining program can of course also be carried out in the CAM system or the programming system, instead of the controller.

When a linear lifting geometry of the edge portion of the machining operation is used, this can very easily be defined by the input of a dimension, e.g. 0.002 mm/1 mm for the pitch and 5 mm for the width of the edge portion. This means that with every millimeter with which the machining operation approaches the edge, the tool would lift by 0.002 mm from the workpiece surface, starting 5 mm away from the edge of the machining operation and ending at a lift height of 0.01 mm on the edge. Of course, the lifting movement is continuous while the tool is moving towards the edge. This is also true for the infeed movement when the tool moves again away from the edge of the machining operation.

There are also machining strategies in the case of which the machining portion has only two sides and the lifting movement can and must therefore also be carried out at two sides only, for instance, in the case of an annular machining portion. Geometrically speaking, this portion has only two boundary sides, the inner circle and the outer circle. Of course, any other desired shapes of the machining portion are also possible and the above-described lifting strategy must then be adapted thereto accordingly so as to avoid steps on the surface. In the case of possible translatory movements in the machining programs these must also be recognized and taken into account. This may e.g. be required in the case of islands in the machining portion. An additional edge portion will then be created around said islands.

If it is known that a tool presses more away in the machining operation than another one that is machining a neighboring portion, i.e., the first tool does not produce the desired dimension due to increased machining forces, but an allowance or oversize is created during machining, such behavior can be compensated in addition by the controller in that the whole machining operation of said tool is carried out in the direction of the workpiece surface at a slightly deeper level. For such a machining operation that is performed deeper by a desired dimension, the inventive correction of the edge portions for avoiding steps can nevertheless be carried out.

Figure 5:
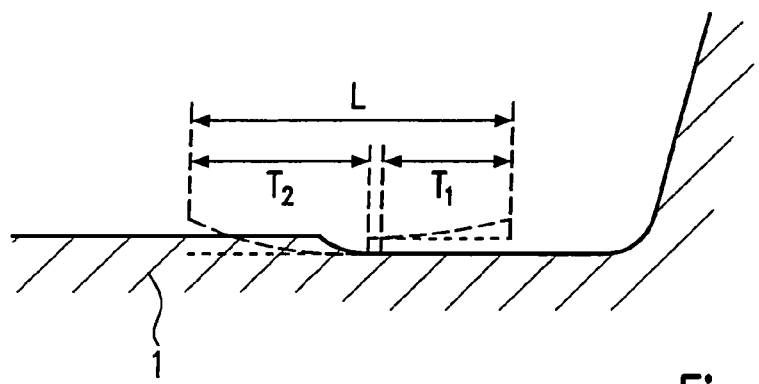
Figure 6:
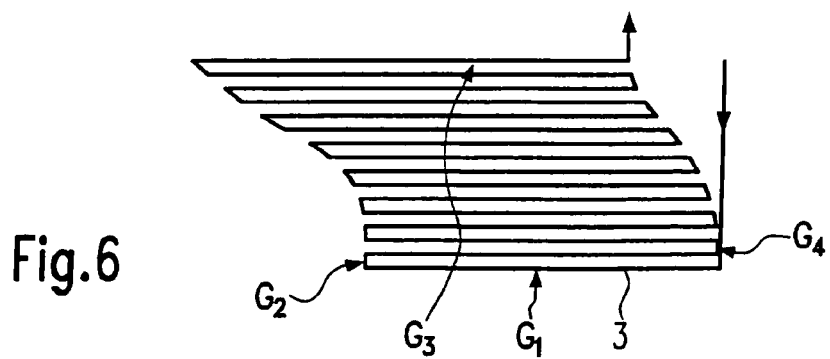
Figure 7:
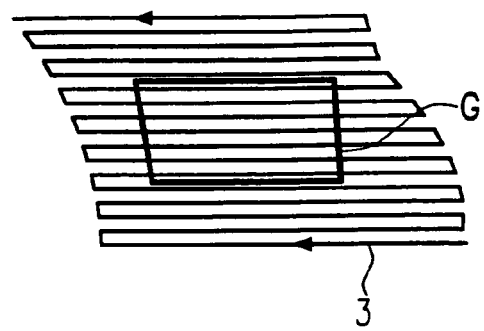
Figure 8:
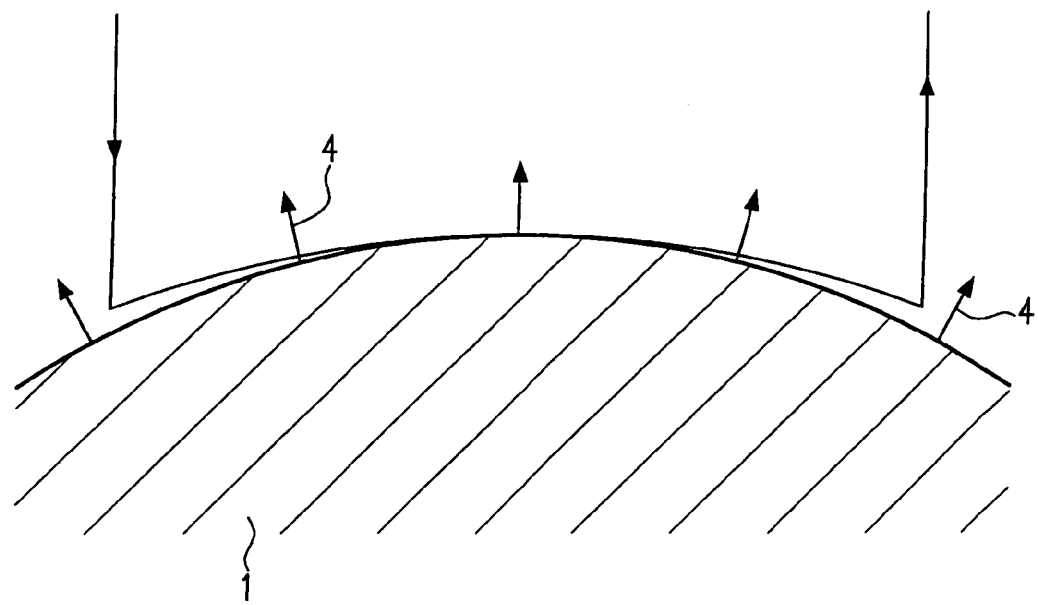

The invention shall now be described in the following with reference to embodiments taken in conjunction with the drawings, in which:

FIG. 5 is a simplified schematic illustration of the transition portions and of the infeed movement or lifting movement according to the invention;

FIG. 6 shows a meandering path of movement of a tool according to the present invention;

FIG. 7 shows a selection of a machining portion by way of an optical definition;

FIG. 8 is a schematic illustration of the normal vectors; and

Figure 9:
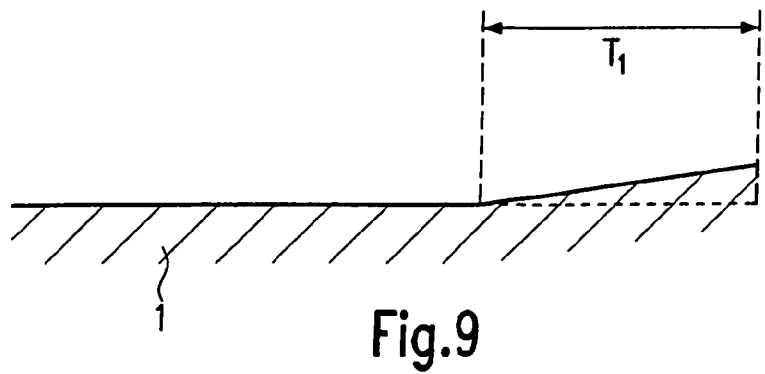

FIG. 9 is a schematic illustration showing a runout movement when the machining limit has been reached.

In the figures, like parts are designated by like reference numerals.

FIG. 5 is a schematic illustration by analogy with the illustration of FIG. 4, which shows a workpiece 1 with a horizontal surface and a transition to an inclined flank. For avoiding the step A as shown in FIG. 4, a tangential runout of the preceding tool and a tangential run-in of the subsequent tool having a smaller diameter take place according to the invention in an overlap region L. In the case of a path-like machining operation progressing from the left side according to FIG. 5 (see also FIG. 2), a tangentially directed lifting or runout movement takes place along path $T_1$. This leads to the contour shown in broken line, which is achieved by the preceding tool (not shown) having a larger diameter. Following a toolchange a subsequent tool having a smaller diameter is slowly fed along a path $T_2$. This results in a slow tangential run-in of the tool. FIG. 5 shows the situation in a strongly exaggerated manner to illustrate the process. It goes without saying that according to the invention in an optimum configuration of the method there is no step or transition inclination.

FIG. 6 shows a meandering tool movement along a workpiece surface. It becomes apparent that four machining limits are provided on the whole in each meandering movement, the four limits being illustrated in the figure by $G_1$, $G_2$, $G_3$ and $G_4$. It is of course also possible to define and plot these limits in a different way, for instance over the whole area of the workpiece surface to be machined in a meandering way.

FIG. 7 shows a further variant in which the limits of the portion to be machined are chosen manually, e.g. on the screen. This portion is indicated by the lines marked by "G".

The path of movement of the tool is designated by "3" in FIGS. 6 and 7.

FIG. 8 is a schematic illustration showing a convex surface of a tool 1 for which several normal vectors 4 have been schematically plotted in the direction of which the lifting or infeed movement is to be carried out.

The normal vectors 4 are normal, i.e. perpendicular, to the workpiece surface.

FIG. 9 shows a schematic illustration of the lifting movement of a tool along a lifting path $T_1$ (by analogy with the illustration of FIG. 5). As can be seen, a linear lifting geometry can be observed according to the invention on the edge portion of the machining operation to provide a smooth transition to a subsequent machining portion.

LIST OF REFERENCE NUMERALS

1 Workpiece
2 Tool
3 Path
4 Normal vector
5 Residual material
R Roughness
A Step
L Overlap region
G Machining limit
T Infeed and/or lifting path

The invention claimed is:

1. A method for machining a workpiece using a rotating cutting tool moved along tool paths relative to the workpiece comprising:
   (a) determining a first machining boundary and a second machining boundary of the workpiece, wherein at least a portion of the second machining boundary overlaps at least a portion of the first machining boundary;
   (b) a first finishing step, comprising:
      defining, within the first machining boundary, a lifting movement of a first tool, and
      machining the workpiece, with the first tool, using a tangential run-out having the lifting movement; and
   (c) a second finishing step, comprising:
      defining, within the second machining boundary, an infeed movement of a second tool; and
      machining the workpiece, with the second tool, using a tangential run-in having the infeed movement, wherein the run-in overlaps at least a portion of the run-out.

2. The method according to claim 1, wherein at least one of the infeed and lifting movement takes place in a direction normal to a surface of the workpiece.

3. The method according to claim 1, wherein at least one of the infeed and lifting movement is defined by a respective tool axis.

4. The method according to claim 1, wherein at least one of the infeed and lifting movement takes place in parallel with normal vectors indicated in a machining program.

5. The method according to claim 1, wherein at least one of the infeed and lifting movement is carried out by way of an online simulation of the machining operation and in a direction normal to a surface of the workpiece.

6. The method according to claim 1, wherein at least one of the infeed and lifting movement takes place at a slow rate.

7. The method according to claim 1, wherein at least one of the infeed and lifting movement takes place over a predetermined machining path.

8. The method according to claim 1, wherein at least one of the infeed and lifting movement compensates for dimensional deviations in a preceding machining process.

9. The method according to claim 1, wherein said first and second machining boundaries are determined in dependence upon the geometry of the workpiece.

10. The method according to claim 1, wherein said first and second machining boundaries are determined manually.

11. A method for machining a workpiece using a rotating cutting tool, comprising:
   moving at least one rotating cutting tool along at least one tool path relative to the workpiece;
   determining a first machining boundary and a second machining boundary of the workpiece, wherein at least a portion of the second machining boundary overlaps at least a portion of the first machining boundary; and
   finishing the workpiece, comprising:
      (i) defining, within the first machining boundary, a lifting movement of a first tool;
      (ii) machining the workpiece, with the first tool, using a tangential run-out having the lifting movement;
      (iii) defining, within the second machining boundary, an infeed movement of a second tool; and
      (iv) machining the workpiece, with the second tool, using a tangential run-in having the infeed movement;
   wherein at least one of said infeed and lifting movement of the tool satisfies at least two of the following:
      (i) the at least one infeed and lifting movement takes place in a direction normal to a surface of the workpiece;
      (ii) the at least one infeed and lifting movement is defined by a respective tool axis;
      (iii) the at least one infeed and lifting movement takes place in parallel with normal vectors indicated in a machining program;
      (iv) the at least one infeed and lifting movement is carried out by way of an online simulation of the machining operation and in a direction normal to a surface of the workpiece;
      (v) the at least one infeed and lifting movement takes place at a slow rate;
      (vi) the at least one infeed and/or lifting movement takes place over a predetermined machining path; and
      (vii) the at least one infeed and lifting movement compensates for dimensional deviations in a preceding machining process.

* * * * *